Feb. 15, 1955 E. M. IRWIN 2,701,960
APPARATUS FOR DETECTING LEAKS
Filed May 24, 1951 2 Sheets-Sheet 2
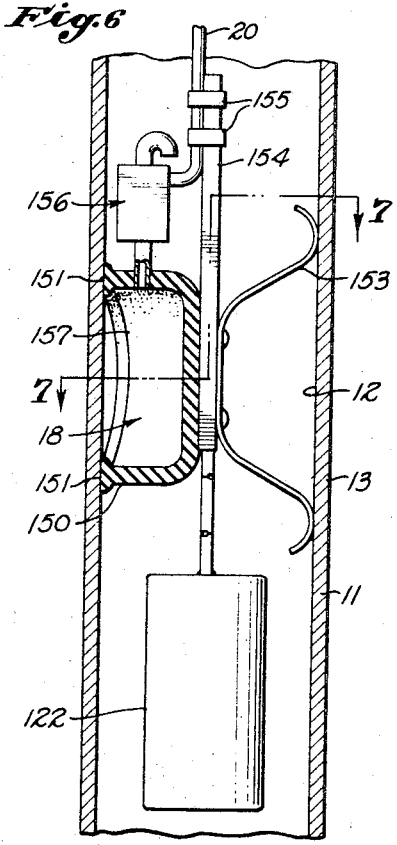
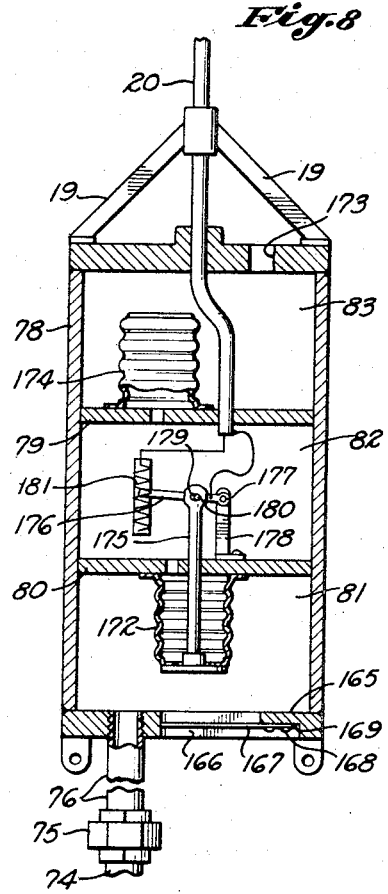
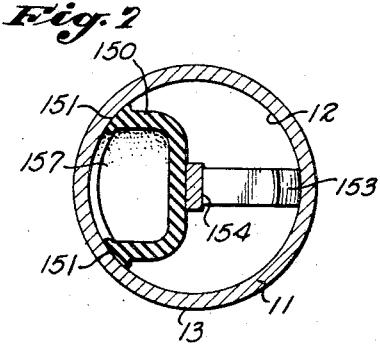
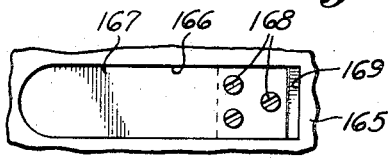
INVENTOR:
EMMETT M. IRWIN
BY HIS ATTORNEYS
HARRIS, KIECH, FOSTER & HARRIS
By Florence F. Kiech

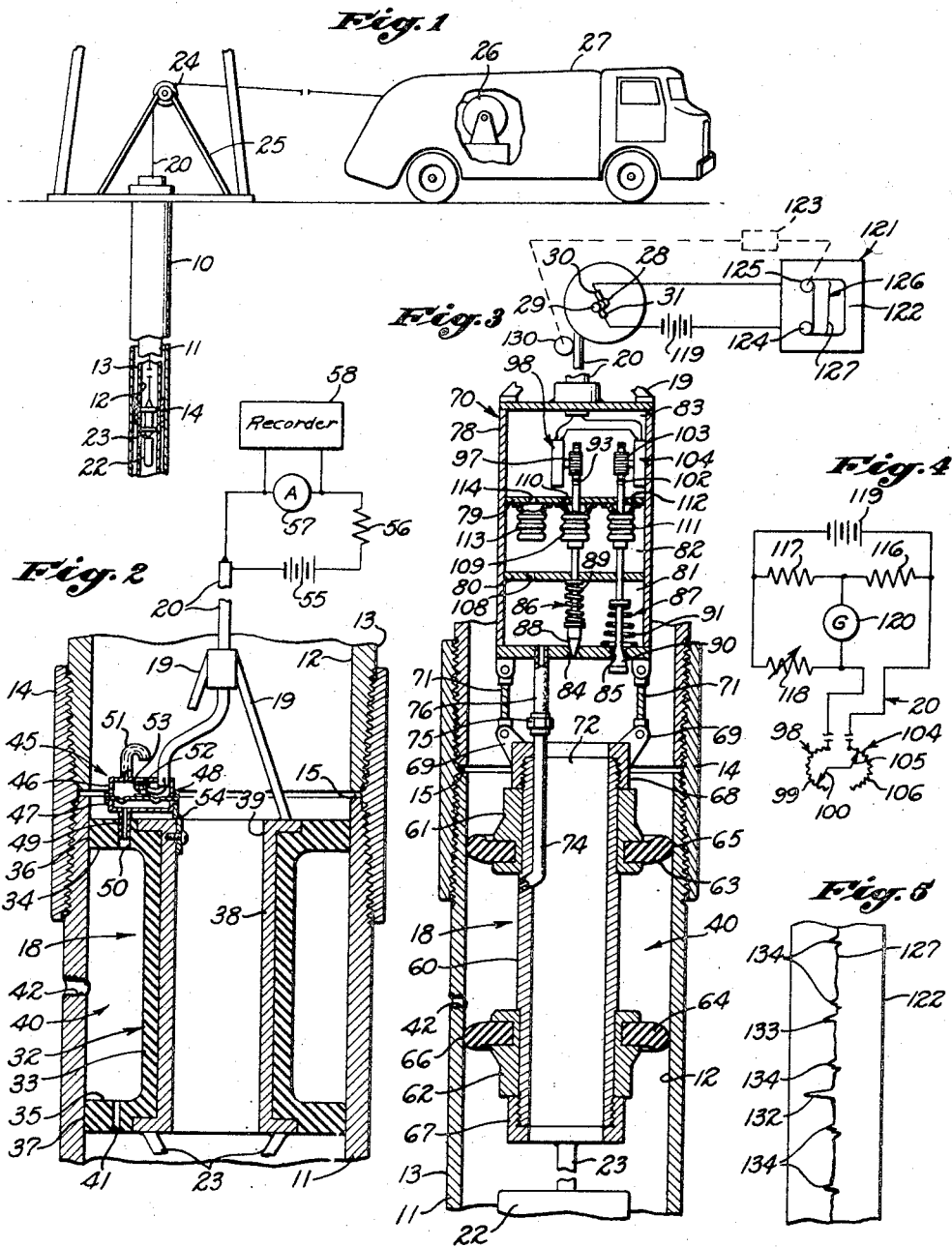

United States Patent Office 2,701,960
Patented Feb. 15, 1955

2,701,960

APPARATUS FOR DETECTING LEAKS

Emmett M. Irwin, San Marino, Calif.

Application May 24, 1951, Serial No. 228,093

14 Claims. (Cl. 73—40.5)

My invention relates to apparatus for detecting leaks in an element separating two zones of different pressure. It will be exemplified with relation to the problem of detecting and locating leaks in an oil well tubing and, if desired, determining the extent or magnitude of the leakage.

No satisfactory apparatus has heretofore been available for detecting, locating or measuring small leaks in an element separating zones of different pressure, and it is an important object of the present invention to provide a novel apparatus which is relatively simple and inexpensive in use and construction, yet which is capable of accurately detecting or locating leaks and, if desired, measuring the magnitude of the existing leakage.

The problem is particularly severe in the petroleum industry as concerns leaks present in the casing or in a tubing through which oil is pumped by a reciprocating pump. In the present specification and claims the word "tubing" is used in a generic sense to define a string of oil well tubing, a well casing, or any other length of pipe or tubing, the invention being used while there is a difference in pressure between the inside and outside of such tubing.

The invention will be exemplified as applied to the problem of detecting and locating leaks in a string of oil well tubing which has been used to conduct the oil to the surface of the ground from a reciprocating pump driven by a string of sucker rods. Due to wear from such rods, corrosion, electrolytic action, and other factors, leaks often develop in such a string of tubing. When the leaks are small, they are very difficult to detect, particularly if they are through the joints between lengths of tubing. The only present method of approximately locating such leaks is to pack off the tubing first at a lower position and then at an upper position, an excess pressure being applied in the intervening zone, and a pressure gage being utilized to determine any drop in this excess pressure. Such a method is extremely laborious and costly and requires resetting of the packing means for each zone to be tested. Such zones must necessarily be large, and it is impractical to obtain any more than a rough approximation as to the location of the leak.

It is an object of the present invention to provide apparatus for detecting, locating and/or measuring leaks in which a chamber-containing unit is progressively moved along and in contact with the element to be tested so that successive sections of the element close this chamber. A further object is to maintain the pressure in the chamber substantially equal to the adjacent pressure in the zone in which the unit is moved, and to detect change in pressure in the chamber or changes in relative pressure inside and outside the chamber to determine the presence of a leak. Another object is to conduct any fluid leakage through the chamber and to measure such fluid leakage as a measure of the magnitude of the leak.

Another object of the invention is to provide a movable unit which in effect scans the length of an element as the unit is moved longitudinally therealong. A further object is to provide such a unit which has an open-faced chamber closed by successive sections of the element as the unit is moved. A further object is to provide sealing edges or surfaces at least partially bounding the periphery of such an open-faced chamber, such sealing edges or surfaces being shaped to conform to the surface of the element along which the unit moves.

A further object of the invention is to transmit to a remote point a signal created by a difference in pressure inside and outside such a chamber. Another object is to record such a signal at the remote point to give, for example, a log of the element or tubing showing its zones of imperviousness or its zones of leaks. Still another object is to drive the record at a speed substantially proportional to the speed of movement of the movable unit along the element or tubing.

In testing a string of oil well tubing joined by collars, it is often desirable that the sealing edges or surfaces of the movable unit be formed of resilient material. Such sealing edges or surfaces may then deform minutely during movement across a tubing joint or from one section of tubing to another. It is an object of the present invention to detect and preferably to record transient changes in pressure in the chamber resulting from such deformation, thus giving definite and accurate knowledge as to the position of the movable unit if each tubing length is known.

Further objects and advantages of the invention will be evident to those skilled in the art from the following description of exemplary embodiments.

Referring to the drawings:

Fig. 1 is a view diagrammatically illustrating the invention as applied to the testing of a string of oil well tubing positioned in a well;

Fig. 2 is a vertical sectional view illustrating somewhat diagrammatically one embodiment of the invention;

Fig. 3 is a vertical sectional view of an alternative embodiment of the invention capable not only of detecting leaks but of measuring their magnitude;

Fig. 4 is a wiring diagram applicable to the embodiment shown in Fig. 3;

Fig. 5 is an elevational view of a record made by the equipment of Fig. 3;

Fig. 6 is a vertical sectional view of an alternative embodiment;

Fig. 7 is a transverse sectional view taken along the line 7—7 of Fig. 6;

Fig. 8 is a longitudinal sectional view of an alternative pressure transducer; and Fig. 9 is an elevational fragmentary view of the reed valve of Fig. 8.

Referring particularly to Fig. 1, illustrating the invention as used in a well, this well is shown as including a casing 10 in which is suspended a string of oil well tubing 11 having an internal surface 12 and an external surface 13 bounding zones of different pressure. As better shown in Figs. 2 and 3, this string of tubing 11 is made up of sections or lengths of tubing joined by collars 14, usually leaving a small, inwardly opening space 15 between the ends of the sections or lengths. This string of tubing 11 is illustrative of any element to be tested for leaks and in which the pressure on one side of the element differs from that on the other. In the arrangement of Fig. 1, the string of tubing 11 is normally filled or partially filled with a column of oil as a result of a prior pumping. Such pumping is most commonly accomplished by use of a reciprocating pump, not shown, which may be withdrawn from the tubing 11 with the string of sucker rods used for reciprocating the pump, leaving the lower end of the tubing closed by a standing valve.

The invention includes a movable unit 18 connected by a bail 19 to a cable 20, conventionally a two-conductor cable or a single cable with a central conductor surrounded by a conducting sheath. This conductor forms a part of a means for lowering and raising the movable unit 18, the lowering being assisted by a weight 22 suspended from the unit 18 by a bail 23. The upper end of the cable 20 extends around a pulley 24 supported in any conventional way as by a tripod 25, this cable extending to a power-driven reel 26 shown as mounted in a truck 27 and including slip rings 28 and 29 (Fig. 3) connected to the two conductors of the cable 20 and contacted by brushes 30 and 31.

The unit 18 may be of any suitable form having an outwardly-facing or open-faced chamber with edges or surfaces slidably engaging and conforming in shape to the surface to be tested. Successive sections of the surface are brought into closing relationship with the chamber as the unit is moved along the surface. The pressure in the chamber is normally maintained substantially equal to the pressure outside the chamber at a nearby position, and any change in the relative pressures inside and outside the chamber is detected as evidence of a leak in the section then closing the chamber.

A structure designed for longitudinal movement internally of a tubing will desirably employ an annular chamber closed peripherally by successive sections of the internal surface 12, in the interest of simplicity and economy in testing all peripheral portions of the tubing in a single pass. Figs. 2 and 3 show spool-like structures of this type.

Referring particularly to Fig. 2, the unit 18 is shown as including a spool-like rubber member 32 including a tubular portion 33 with flanges or sealing members 34 and 35 extending outwardly to provide sealing edges or surfaces 36 and 37 shaped to conform to the interior surface 12 of the tubing. The sealing members 34 and 35 are spaced a substantially constant distance from each other in a direction longitudinally of the tubing so that the sealing surfaces 36 and 37 slidably engage the internal surface 12 in zones spaced from each other and with a section of the tubing 11 therebetween. If desired, the spool-like member 32 may be reinforced by a flanged metal member 38. This member provides a relatively large passage 39 communicating at one end with the tubing fluid above the unit 18 and at the other end with the tubing fluid below the unit 18. The passage 39 permits displacement of the tubing fluid through the unit 18 as the unit is raised or lowered in the tubing 11.

The tubular portion 33 and the sealing members 34 and 35 provide an open-faced chamber 40 which in this embodiment comprises an outwardly-facing annular chamber. The chamber 40 is closed by successive sections of the tubing 11 as the unit 18 is moved with the sealing surfaces 36 and 37 in engagement with the tubing.

The unit 18 includes means for maintaining the internal pressure in the chamber 40 substantially equal to the external pressure thereadjacent, e. g., the pressure of the tubing fluid near the unit 18. This means may include the sealing edges or surfaces 36 and 37 themselves inasmuch as any leakage past such edges or surfaces will tend to maintain the pressure in the chamber 40 substantially equal to the pressure outside the chamber in the zone of movement of the unit 18. However, it is often desirable to supplement this pressure-equalizing action by employing a small passage 41 providing one end opening on the chamber 40 and another on a zone outside the chamber. The passage 41 is shown as extending through the sealing member 35 but it might equally well extend through any of the walls of the unit 18 bounding the chamber 40. This passage 41 should be quite small and should substantially restrict the flow therethrough should there be a leak 42 in the section of the tubing then closing the chamber 40.

Any such leak in the tubing will reduce the pressure in the chamber 40 if the leak is outward, or increase the pressure in the chamber 40 if the leak is inward. In testing a string of oil well tubing containing a column of oil, the pressure inside the tubing will normally be greater than the pressure outside this tubing so that the pressure in the chamber 40 will suddenly drop when the unit is bridged by a leaking zone section of the tubing. In such testing, the chamber 40 will be filled with oil and even a small leak will decrease the chamber pressure very rapidly, tending to equalize the pressure in the chamber and the pressure outside the tubing.

The invention includes means responsive to changes in pressure in the chamber 40 for creating a signal and means at the surface of the ground responsive to this signal. Preferably, the invention includes means responsive to differences in pressure between the chamber 40 and the zone outside the chamber but adjacent thereto, such means detecting changes in chamber pressure resulting from a leak. In this connection, the invention can employ any differential-pressure-responsive means, herein designated as a differential pressure transducer. In Fig. 2 this differential pressure transducer is indicated by the numeral 45 and is shown as including upper and lower housing sections 46 and 47 with a diaphragm 48 clamped therebetween and forming a movable member which changes its position in response to differences in pressure applied to its opposed faces or sides. The chamber below the diaphragm communicates through a small pipe 49 with the chamber 40, this pipe being removably connected in an opening 50 of the upper sealing member 34. The chamber above the diaphragm 48 communicates through a pipe 51 with the oil or other fluid in the tubing at a position near the unit 18, the pipe 51 being shown as a bent pipe so that its open end faces downwardly. Contacts 52 and 53 are respectively carried by the upper housing section 46 and the diaphragm 48, being connected to the conductors of the cable 20. The differential pressure transducer 45 is preferably removably connected to the unit 18, as by a bracket 54, so that the same device can be used with units of different size in the testing of tubing of different diameter.

In the absence of a leak and when the pressures inside and outside the chamber 40 are substantially equal, the contacts 52 and 53 will, with the arrangement shown, remain closed and the current will flow through a battery or other potential source 55, a current-limiting resistor 56 and an ammeter 57 connected serially with the contacts. If desired, a recorder 58 may be connected in the circuit, as by being connected in parallel with the ammeter 57, to record the changes in current, this recorder being driven at a speed proportional to the speed of the unit 18.

When the unit 18 bridges a section of the tubing containing a leak, the pressure inside the chamber 40 will drop below the pressure outside this chamber, causing the contacts 52 and 53 to separate. This breaks the circuit through the ammeter and recorder and indicates the presence of a leak. As the unit 18 moves beyond the section containing the leak, the pressures inside and outside the chamber 40 substantially equalize to close the contacts 52 and 53 to re-establish the current in the circuit. In this embodiment, the contacts form a signaling means, and the ammeter 57 or recorder 58 forms the means responsive to this signal.

If desired, the invention can be designed not only to detect or locate leaks but also to determine the extent or magnitude of the leakage. Fig. 3 shows diagrammatically how this can be accomplished and also shows a modified construction for the unit 18.

In Fig. 3 the unit 18 includes a rigid tube 60 with attached collars 61 and 62 forming a means for mounting upper and lower sealing members 63 and 64 at positions spaced from each other in the direction of movement of the unit 18. The sealing members 63 and 64 are made of rubber or other resilient material and are in the form of rings with their inner portions rigidified and retained by the collars 61 and 62. The outer portions form sealing edges or surfaces 65 and 66, here shown as of arcuate form. The sealing members 63 and 64 may be of any suitable construction so long as they form a relatively effective seal with the interior surface 12 while sliding therealong. The lower end of the rigid tube 60 is threaded to receive a collar 67 which supports the bail 23 and the weight 22. The upper end of the tube 60 threadedly receives a collar 68 providing ears 69 to which a flow-measuring device or differential pressure transducer 70 is removably connected as by short cables 71, thus permitting a single device or transducer 70 to be readily used with movable units of different size. The tube 60 provides a passage 72 corresponding to the passage 39. The aforesaid chamber 40 is bounded by the tube 60, the sealing members 63 and 64, and the section of the tubing between the latter. A pipe 74 extends along the passage 72 with its lower end opening on the chamber 40 and with its upper end detachably connected by a coupling 75 to a flexible tube 76 depending from the differential pressure transducer 70.

The flow-measuring device or differential pressure transducer 70 is shown diagrammatically as including a closed housing 78 divided internally by partitions 79 and 80 into three chambers 81, 82 and 83. The flexible tube 76 opens on the lower chamber 81 into which fluid may flow through a sharp-edged orifice 84 and out of which fluid may flow through a sharp-edged orifice 85. These orifices are respectively associated with or a part of flow-responsive or flow-measuring means 86 and 87 which measure the rate of flow into and out of the chamber 81. The means 86 is shown as including a needle valve member 88 comprising a member which moves in response to differences in pressure applied thereto and which is normally seated on the sharp edge of the orifice 84 by a light compression spring 89. Should the pressure in the chamber 81 be less than the pressure outside this chamber, the needle valve 88 will rise in an amount determined by the volume of flow through the orifice 84. The means 87 includes a tapered valve member 90 resiliently held in contact with the sharp edge of the orifice 85 by a light compression spring 91. Should the pressure in the chamber 81 be higher than the pressure outside this chamber, the tapered valve member 90 will move downwardly in proportion to the rate of fluid flow through the orifice 85.

The pressure in the chamber 81 is equal to the pressure in the chamber 40 because of the open communication therebetween through the pipe 74. Should the pressure in the chamber 81 be different from the pressure outside this chamber, one or the other of the valve members 88 or 90 will be displaced to substantially equalize these pressures, assuming that no leak is present in the section of the tubing between the sealing members 63 and 64. Thus, in this embodiment the pipe 74 and the means 86 and 87 may be utilized as the means for maintaining the pressure inside the chamber 40 substantially equal to the pressure outside this chamber. If desired, however, a small passage equivalent to the passage 41 can be additionally used in this connection, although this is usually not necessary.

The chamber 83 of the differential pressure transducer 70 encloses two signal means respectively responsive to the means 86 and 87. As diagrammatically shown, the upper end of the needle valve member 88 extends through the chamber 82 and carries a rack 93 which rotates a pinion 97 connected to a rotary-type, variable impedance 98 such as a variable resistor having an arcuate winding 99 and a movable contact 100 (Fig. 4) advanced by rotation of the pinion 97. The term "variable impedance" is used in a broad sense as including any variable means which changes an electric value in response to movement of the flow-measuring means connected thereto. This electric value may be an electrical potential, current, resistance, reactance, reluctance, etc. In the arrangement shown, any rise in the valve member 88 will proportionally advance the movable contact 100 and proportionally decrease the resistance of the variable impedance 98.

In the same manner, the upper end of the valve member 90 of the means 87 carries a rack 102 which turns a pinion 103 of a variable impedance 104, thus correspondingly changing the position of a movable contact 105 on an arcuate winding 106. Correspondingly, in the arrangement shown the resistance of the variable impedance 104 increases with and is a measure of the degree of movement of the tapered valve member 90 and the outward flow from the chamber 81.

The chamber 83 is preferably filled with a clean oil and sealed relative to the chamber 82, the latter being connected to the chamber 81 by a port 108. To seal the junction of the partition 79 and the member 88, I provide a bellows 109 with its closed end fixed to the member 88 and with its interior communicating through a port 110 with the chamber 83. Likewise, the closed end of a bellows 111 is connected to the member 90, the interior of the bellows 111 being connected by a port 112 to the chamber 83. A third bellows 113 communicates internally through a port 114 with the chamber 83 and has a pressure equalizing function to maintain the pressures in the chambers 82 and 83 equal and to compensate for displacement of the bellows 109 and 111.

Exemplary signal-detection means is shown in Figs. 3, 4 and 5. Referring thereto, the movable contacts 100 and 105 are preferably electrically interconnected as best shown in Fig. 4, the ends of the windings 99 and 106 being connected through the conductors of the cable 20 and through the brushes 30 and 31 to one leg of a Wheatstone bridge, the other legs including impedances 116, 117 and 118, the latter for example being variable. Across the energizing diagonal of the bridge is connected a battery 119. Across the other diagonal of the bridge is connected a galvanometer 120 of a recorder 121. This recorder is shown diagrammatically as including a record 122 exemplified as a strip of paper advanced by a record-driving means 123 from a roller 124 to a roller 125. The galvanometer 120 is connected to a recording element shown as a pen 126 which swings to one side or the other of a base line 127 of the record 122. The record-driving means 123 is operatively connected to advance the record 122 in proportion to the movement of the unit 18. This can be accomplished in any suitable manner as by utilizing a roller 130 engaging the cable 20 and connected mechanically or electrically to the record-driving means 123.

The structure of Fig. 3 is designed to detect inward or outward leaks through the tubing 11 and to record the position and magnitude of such leaks. Its operation is as follows.

Assuming that an oil-filled tubing 11 is to be surveyed, the unit 18 is lowered in the tubing by unwinding the cable 20 from the reel 26, the weight 22 being large enough to lower the unit. The circuits are then energized and the bridge is adjusted so that the pen 126 is opposite the base line 127. At this time the pressures in the chambers 40, 81, 82 and 83 are substantially equal, and the flow-responsive means 86 and 87 will be in orifice-closing positions. The reel 26 is then rotated to raise the unit 18 slowly in the tubing 11.

So long as the unit 18 is bridged by perfect sections of the tubing, the pen 126 will remain near the base line 127 except that it may waiver due to minor irregularities or roughness of the internal surface 12 which may cause transient deformations of the sealing members 63 and 64 and thus effect transient changes in pressure in the chamber 40. Assuming that the chamber 40 is closed by a section of the tubing containing a leak 42 and assuming that the pressure outside the tubing is less than the pressure inside thereof, the fluid pressure in the chamber 40 will suddenly decrease, causing the pen 126 to depart from the base line 127 and later return thereto when the defect has been passed, forming a peak 132. During the time that the leak is in communication with the chamber 40, fluid will flow from the interior of the tubing upwardly through the orifice 84 into the chamber 81 and through the pipe 74 to the chamber 40, the volume of this flow being dependent upon the size of the leak, the valve member 88 rising in amount related to this flow. Correspondingly, the height of the peak 132, measured from the base line 127, is a measure of the magnitude of the leakage. The position of the peak 132 along the base line 127 is an indication of the location of the leak. During later movement of the unit 18, if a smaller leak is encountered, a smaller peak 133 will be produced on the record. If the apparatus is used to detect inward leaks, the peaks will be on the opposite side of the base line 127 because such inward leaks will progressively increase the resistance of the variable impedance 104 while the aforesaid inward leaks will decrease the resistance of the variable impedance 98.

As the unit 18 of Figs. 2 or 3 traverses a joint of the string of tubing 11, minor changes in pressure in the chamber 40 of a transient nature may occur, particularly if the adjoining sections or lengths of tubing are not exactly flush. For example, if these tubing lengths are separated by the inwardly-opening space 15, each sealing edge or surface 36, 37 or 65, 66 may be momentarily retarded, the corresponding sealing member being momentarily flexed to change the pressure in the chamber 40. This is often of distinct advantage in that the record will show a series of small undulations or pips 134 spaced from each other a distance proportional to the joint spacings. These pips are useful not only in indicating or verifying the overall position of the unit 18 in the tubing but also in definitely locating a leak with respect to the ends of the tubing length in which it occurs. If the undulations or pips 134 are of undue length in the flow-measuring structure of Fig. 3, they will indicate the presence of a leak in the joint itself.

Should any leak be detected, the movement of the unit 18 can be stopped to verify the detection or it may be returned to the faulty zone for such vertification. In the arrangement of Figs. 3–5, a supplementary record of the leak can be obtained by throwing the bridge temporarily off balance, thus displacing the base line 127 from its normal center and thus obtaining another record of the location and magnitude of the leak as the unit 18 is moved to retraverse the faulty zone.

In its broader aspects, the invention is not limited to the use of the chamber 40 which simultaneously tests all peripheral portions of the tubing at a particular location. Thus, the movable unit may be of cup-like form with sealing edges or surfaces conforming in shape to a flat or curved surface to be tested, the cup-like unit being moved along the surface to bring successive portions of adjacent longitudinal zones thereof into closing relationship with the chamber. Such a cup-like unit may also be used to test a tubing, as suggested in Figs. 6 and 7, where the movable unit 18 is a cup-like member 150 having sealing edges or surfaces 151 shaped to conform to the internal surface 12. However, the cup-like member 150 should desirably be biased to hold its sealing edges or surfaces 151 in engagement with the internal surface. This is accomplished in the embodiment of Figs. 6 and 7 by using a biasing means in the form of a double-arm spring 153 secured to a rod 154 which is in turn secured to the cup-like member 150. The rod 154 may be secured to the cable 20 as by clamps 155, this cable extending to a differential pressure transducer 156 which is responsive to changes in relative pressure between the inside and outside of a chamber 157 bounded by the cup and by an arcuate zone of the tubing. By repeated passes, such a movable unit 18 may be used to scan adjacent arcuate sections.

The alternative of Figs. 6 and 7 is useful in determining the peripheral location of a leak. For example, if lowered on a pipe so that its radial position relative to the tubing can be changed, such a unit can be employed to detect the peripheral position of a leak determined by this same unit or by units of the type shown in Figs. 2 and 3. The directional orientation of the unit shown in Figs. 6 and 7 relative to the tubing can be determined by any one of a number of known methods for detecting subterranean directions.

Fig. 8 illustrates an alternative pressure transducer which can be used with any of the units 18 previously described, being shown as capable of direct substitution for the pressure tranducer 70 in Fig. 3 and carrying the same numerals where applicable. In Fig. 8, the closed housing 78 is divided by the internal partitions 79 and 80 into the chambers 81, 82 and 83, with the flexible tube 76 opening on the lower chamber 81 as before. In this embodiment, however, the housing 78 provides a lower wall 165 with a relatively large opening 166 therein which is normally substantially closed by a relatively stiff reed valve 167 secured by screws 168 in a depression 169 of this lower wall. This reed valve has the advantage that if the unit 18 should bridge a very large leak, the reed will deflect inwardly to provide a relatively large passage for fluid flow into the chamber 40 to prevent any possible collapse of the walls thereof if the device is being operated at great depth, thus acting somewhat like a safety valve.

The pressure in the chamber 81 is equal to the pressure in the chamber 40 so that any difference in pressure between the chamber 81 and the surrounding fluid will be indicative of a leak in the tubing. To detect such a pressure differential a bellows 172 is employed. The pressure on the interior of this bellows is equal to the pressure of the surrounding fluid, this being accomplished by use of a port 173 which admits the external fluid to the chamber 83, a bellows 174 transferring the pressure thereof to the clean oil in the chamber 82, this oil filling the interior of the bellows 172.

The closed end of the bellows 172 is connected by a sliding link 175 to a contact arm 176 pivoted at 177 to a bracket 178. This connection is shown as including an elongated opening 179 in the link 175 through which passes a pin 180 of the contact arm 176. This contact arm is thus displaced arcuately relative to a strip-type resistor 181 in response to differences in pressure between the chamber 40 and the surrounding pressure. The resistance of the variable resistance formed by the resistor 181 and the contact arm 176 is thus a measure of the pressure differential and can be imposed in the variable arm of the bridge of Fig. 4 as a substitute for the variable impedances 98 and 104. Inward and outward leaks through the tubing will result in changes in resistance in opposite directions, and these leaks can be recorded as previously described.

It will be understood that the showings of the instant specification are diagrammatic and exemplary. Various types of differential pressure transducers, whether responsive exclusively to pressure differences or also to rate of flow, are known in the art and can be employed without departing from the spirit of the invention. Likewise, the sealing members 34, 35 or 63, 64 may be constructed in a variety of known ways designed to slide along the surface to be tested while forming a relatively good seal.

One of the features of the present invention is the establishment of a localized test zone which is advanced relative to the surface to be tested and the detection of changes in relative pressure between this zone and an adjacent zone in locating or measuring leaks. While the zones are often filled with liquid to obtain a more sensitive determination, this is not essential. The zones may contain fluids such as gases without departing from the spirit of the invention. Likewise, it is not invariably necessary that the fluids in the two zones be identical, although this is preferred as a matter of convenience.

The recorders 58 and 121 may take any one of a number of forms. The illustrated strip recorder is merely exemplary, and it should be apparent that other recorders may be used whether or not they produce an immediate visible record or graph. A graphical-type recorder is, however, preferred as giving an immediately usable log of the tubing.

Various changes and modifications can be made without departing from the spirit of the invention as defined in the appended claims.

I claim as my invention:

1. A leak-testing apparatus adapted for longitudinal movement in contact with one surface of an element separating two zones of different pressure for detecting the location of leaks through said element, said surface bounding one of said zones, said leak-testing apparatus including: a movable unit providing an open-faced chamber and sealing edges at least partially bounding the periphery of the open face of said chamber, said sealing edges being shaped to conform to said surface, said open face of said chamber being closed by successive sections of said element as said unit is moved in said one zone with its sealing edges in engagement with said surface, any leakage between said edges and said surface during relative movement therebetween tending to maintain the pressure in said chamber substantially equal to the pressure in said one zone, said pressure in said chamber changing relative to said pressure in said one zone because of the presence of any leak in the section of said element closing said open face of said chamber; a small pressure-transfer pipe means opening on said chamber; a differential pressure transducer providing a transducer chamber communicating through said pressure-transfer pipe means with said open-faced chamber, said pipe means maintaining the pressure in said transducer chamber substantially equal to that in said open-faced chamber, said pressure transducer including a reciprocable member having two opposed pressure-receptive surfaces, one of said pressure-receptive surfaces opening on said transducer chamber; means for delivering to the other of said pressure-receptive surfaces the pressure of said one zone, whereby said reciprocable member assumes a position dependent on the relative pressures in said one zone and in said transducer chamber; and means for detecting changes in position of said reciprocable member at a point remote therefrom.

2. A leak-testing apparatus as defined in claim 1 in which said movable unit includes a small passage means communicating between said one zone and said chamber to maintain the pressure in said chamber substantially equal to the pressure in said one zone.

3. A leak-testing apparatus as defined in claim 1 in which said means for detecting said change in position of said reciprocable member includes an electric circuit extending to said remote point and means for changing the impedance of said electric circuit in response to a change in position of said member to change an electric value in said circuit, said remote means including means at said remote point responsive to such change in electric value in said electric circuit.

4. A leak-testing apparatus as defined in claim 3 in which said means for changing the impedance of said electric circuit includes a pair of contacts and means for operatively connecting one of said contacts to said reciprocable member to move into and out of contact with the other of said contacts in response to movement of said reciprocable member in opposite directions.

5. A leak-testing apparatus as defined in claim 3 in which said means for changing the impedance of said electric circuit includes a variable impedance and means operatively connecting same to said reciprocable member to vary said electric value in response to the degree of movement of said reciprocable member.

6. A leak-testing apparatus as defined in claim 1 in which said differential pressure transducer includes an opening communicating between said transducer chamber and said one zone, and a spring-biased pressure-responsive valve closing said opening.

7. A leak-testing apparatus adapted for longitudinal movement inside a liquid-filled section of tubing for detecting the location of leaks therein, said apparatus including: a movable unit providing an open-faced chamber and resilient sealing edges slidably engaging the interior surface of said tubing during such longitudinal movement, said open-faced chamber being closed by successive sections of said interior surface during longitudinal movement of said unit inside said tubing, such chamber being filled with a body of liquid and said unit including means for maintaining the pressure of said liquid in said chamber normally substantially equal to the pressure of the liquid in said tubing at a position adjacent said unit, any minute leak in said tubing causing an immediate change in the pressure of said liquid in said chamber relative to the pressure of said liquid in said tubing and because of liquid flow through such leak; a differential pressure transducer communicating respectively with said chamber and with said liquid in said tubing at a position spaced from said chamber to be responsive to differences in pressure between said liquid in said chamber and said liquid in said tubing at said position; means for detecting said change in the pressure of said liquid in said chamber as an indication of the leak causing it; and means for mechanically connecting said movable unit and said differential pressure transducer in end-to-end relationship.

8. A leak-testing apparatus adapted for longitudinal movement inside a fluid-filled tubing providing interior and exterior surfaces respectively subject to different internal and external fluid pressures for determining the location of leaks in said tubing, said leak-testing apparatus including: a unit movable inside said fluid-filled tubing and longitudinally thereof, said unit including two sealing members respectively providing sealing surfaces conforming in shape to said interior surface of said tubing and means for spacing said sealing members a substantially constant distance from each other in a direction longitudinally of said tubing whereby said sealing surfaces engage said interior surface at longitudinally-spaced zones with a section of said tubing therebetween, said unit providing a chamber between said sealing members and closed by successive sections of said tubing as said unit is moved longitudinally along said tubing, said chamber being filled with the same fluid as fills said tubing, the pressure in said chamber changing relative to said internal fluid pressure adjacent said unit when the section closing said chamber contains a leak, such change in relative pressure occurring because of fluid flow through said leak; and means for detecting such change in relative pressure, said last-named means including a flexible member having opposed surfaces respectively receiving said fluid pressure adjacent said unit and said chamber pressure, and means for detecting flexure of said member.

9. A leak-testing apparatus as defined in claim 8 including a housing providing two pressure chambers separated by said flexible member, means for maintaining the pressure in one of said pressure chambers substantially equal to said fluid pressure adjacent said unit, and means for maintaining the pressure in the other of said pressure chambers substantially equal to the pressure in said chamber disposed between said sealing members.

10. A leak-testing apparatus adapted for longitudinal movement inside a liquid-filled upright tubing providing interior and exterior surfaces respectively subject to different internal and external pressures for determining the location of leaks in said tubing, said leak-testing apparatus including: a unit movable longitudinally inside said tubing, said unit including two sealing members respectively providing resilient sealing surfaces conforming in shape to said interior surface, a rigid impervious tube providing an open-ended passage, and means for mounting said sealing members on said rigid tube at positions spaced from each other axially of said rigid tube whereby said sealing surfaces slidably engage said interior surface at longitudinally-spaced zones with a section of said tubing therebetween, said unit providing an outwardly-facing annular chamber between said sealing members and around said rigid pipe and closed by successive sections of said tubing as said unit is moved longitudinally therein, said open-ended passage communicating with the liquid in said tubing on opposite ends of said unit to permit displacement of said liquid through said passage as said unit is moved longitudinally in said tubing; a differential pressure transducer including a housing providing a transducer chamber, a movable member in said transducer chamber and means for mounting said member for to and fro movement in response to differences in pressure existing in said transducer chamber and outside said housing; means for connecting said housing to said unit to move therewith; a small pipe providing one end communicating with said annular chamber and providing another end communicating with said transducer chamber to substantially equalize the pressures in such chambers; and means for detecting changes in position of said movable member as an indication of the presence of a leak in said section of tubing transiently closing said annular chamber.

11. A leak-testing apparatus adapted for longitudinal movement inside a liquid-filled section of well tubing for detecting the location of leaks therein, said apparatus including: a movable unit providing an outwardly-open chamber having resilient sealing edges slidably engaging the interior surface of said tubing when moved along the interior thereof, said outwardly-open chamber being closed by successive sections of said interior surface during longitudinal movement of said unit inside said tubing, such chamber being filled with liquid, any leakage between said sealing edges and said interior surface tending to maintain the pressure in said chamber substantially equal to the pressure of said liquid in said tubing at a position adjacent said unit, such pressures changing relatively because of the presence of any minute leak in the section of said interior surface transiently closing said chamber; a pressure transducer housing providing a flexible wall separating first and second chambers on opposite sides thereof; walls defining a passage openly communicating at its ends respectively with said first chamber and said chamber of said movable unit to transmit changes in pressure in the latter chamber to the former chamber to act on one side of said flexible wall; means for transmitting the pressure of said tubing liquid at said adjacent position to said second chamber to act on the other side of said flexible wall, said flexible wall moving upon change in relative pressure in said first and second chambers; a pair of electrical elements in said second chamber; and means for operatively connecting one of said electrical elements to said flexible member to move relative to the other of said electrical elements to create a signal indicative of a change in said relative pressure in said first and second chambers resulting from a leak in the section of said surface then closing said chamber of said unit.

12. A combination as defined in claim 11 including means for suspending said housing in said well tubing, and means for suspending said unit below said housing to move therewith.

13. A combination as defined in claim 11 in which said housing provides an opening extending between said first chamber and said tubing liquid outside said housing, and a displaceable valve member normally closing said opening but displaceable to permit flow therethrough upon sudden and severe differences in pressure between said first chamber and said tubing liquid outside said housing.

14. A combination as defined in claim 11 in which said second chamber is filled with a dielectric liquid, and in which said means for transmitting the pressure of said tubing liquid to said second chamber includes a pressure transfer member carried by said housing and separating said tubing liquid and said dielectric liquid.

References Cited in the file of this patent

UNITED STATES PATENTS

| Number | Name | Date |
|---|---|---|
| 1,652,472 | Erwin et al. | Dec. 13, 1927 |
| 2,202,404 | Sease | May 28, 1940 |
| 2,218,155 | Rusler et al. | Oct. 15, 1940 |
| 2,277,898 | Andrew | Mar. 31, 1942 |
| 2,365,794 | Armentrout et al. | Dec. 26, 1944 |
| 2,564,198 | Elkins | Aug. 14, 1951 |
| 2,625,039 | Wagner | Jan. 13, 1953 |

FOREIGN PATENTS

| 133,056 | Great Britain | Dec. 16, 1920 |